Dec. 22, 1970    W. J. NEILSON    3,549,214
FLOATING SEGMENT BEARING
Filed June 13, 1969
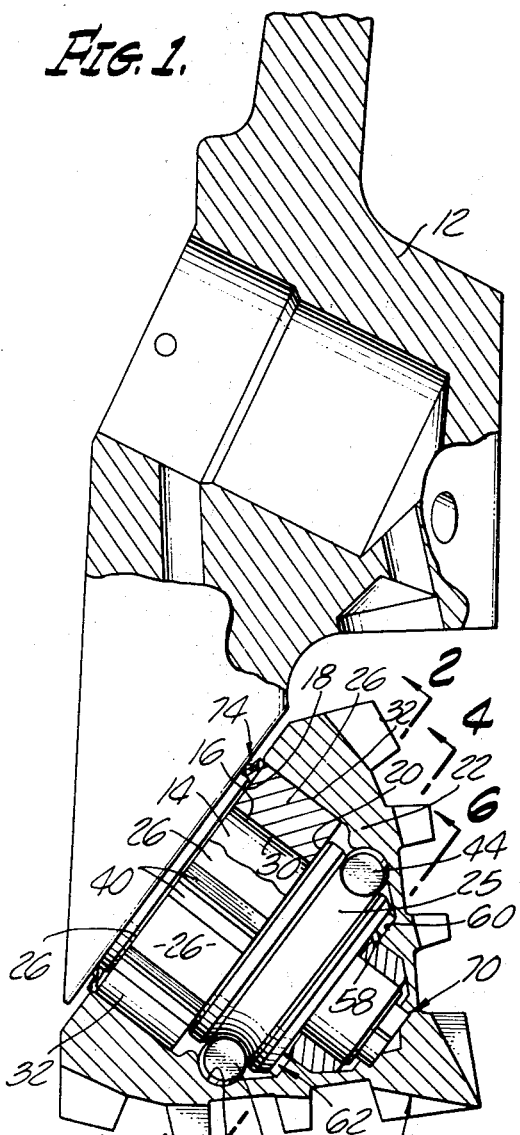
FIG. 1.
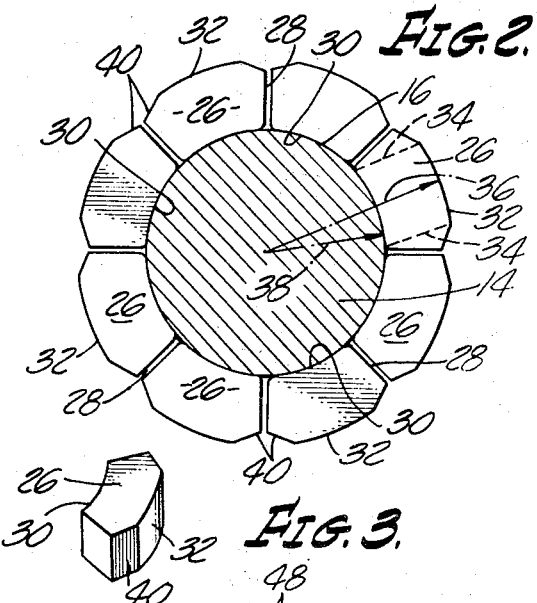
FIG. 2.
FIG. 3.
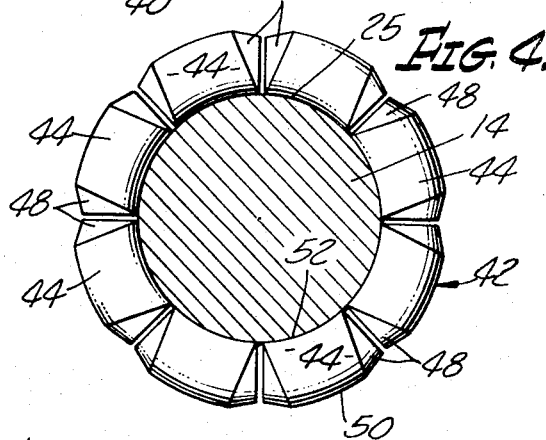
FIG. 4.
FIG. 5.
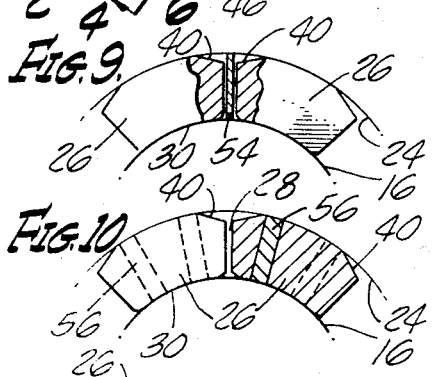
FIG. 9.
FIG. 10.
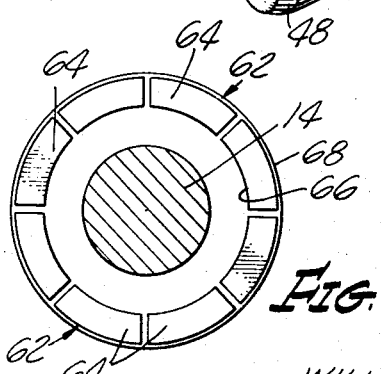
FIG. 6.
FIG. 8.
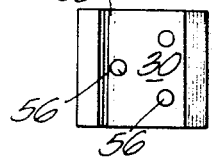
FIG. 11.
FIG. 7.
INVENTOR.
WILLIAM J. NEILSON
BY
Allante Mockabee
ATTORNEY United States Patent Office 3,549,214
Patented Dec. 22, 1970

3,549,214
FLOATING SEGMENT BEARING
William J. Neilson, Whittier, Calif., assignor to Smith Industries International, Inc., Whittier, Calif., a corporation of California
Continuation-in-part of application Ser. No. 625,389, Mar. 23, 1967. This application June 13, 1969, Ser. No. 840,586
Int. Cl. F16c *17/03, 19/14*
U.S. Cl. 308—8.2                                   13 Claims

ABSTRACT OF THE DISCLOSURE

The bearing is made up of segments which lie about, within, or between rotatable parts, and are of a different coefficient of friction than that of said parts. The segments comprise unconnected arcuate increments of a 360° whole and have considerable weight bearing contact as compared with roller bearings and ball bearings. They seat against the rotatable part or parts independently of each other. In one form of assembly the segments describe a circle between relatively rotatable parts of different diameters and the inner and outer diameters of the arcuate bearing segments are so arranged that the frictional drag differences, due to their different radii, is compensated for so that the inner and outer surfaces of the segments have substantially a balanced frictional drag against their respective cooperating rotating parts, thereby permitting random indexing of the segments relative to the rotatable parts. The spaces between the segments freely admit and distribute lubricants.

CROSS REFERENCE

This is a continuation of my application Ser. No. 625,389, filed Mar. 23, 1967.

PRIOR ART

The following prior art is known:

| Patent No. | Issue Date | Inventor |
| --- | --- | --- |
| 1,173,369 | 2/29, 1916 | W. E. Moore. |
| 1,936,894 | 11/28, 1933 | R. H. Whiteley. |
| 2,104,819 | 1/11, 1938 | R. W. Schlumpf. |
| 2,106,860 | 2/1, 1938 | M. Tibbetts. |
| 2,860,932 | 11/18, 1958 | H. C. Hill. |
| 2,268,770 | 1/6, 1942 | E. Orshansky, Jr. |
| 3,086,826 | 4/23, 1963 | R. L. Gunnell. |
| 3,299,973 | 1/24, 1967 | K. H. Swart et al. |
| 1,464,065 (French) | 11/21, 1966 | E. Moulin. |

DISCLOSURE

This invention relates to a floating segment bearing. It is intended primarily for use in place of ball bearings or roller bearings.

Ball or roller bearings are used in place of sleeve bearings, split or not, because of the reduced friction contact between the bearing and the journal or race. Furthermore, in many instances, it is impractical, from an assembly standpoint, to use sleeve bearings. Also sleeve bearings do not provide for balanced clearance spaces by the nature of their construction. They do not index with rotation of the rotary member or members and consequently wear excessively at the point of greatest pressure.

Movable bearings, such as ball or roller bearings, are widely used in place of stationary sleeve bearings because of the reduced areas of contact between said bearings and the parts in which they are used, and also because they rotate individually between the relatively rotatable parts whose friction they are intended to reduce.

It has been found that where the relatively rotatable parts are subject to heavy loads, ball bearings and roller bearings have such small points or lines of contact with the relatively rotatable parts, that one or both of the parts will soon be subject to spalling. For example, in the use of rock bits for deep well drilling, the bit may comprise three journals, each having a rotary cutter thereon. The bit as a unit may be subject to pressures for example of 75,000 lbs., so that the journal of each of the three sets of journals and cutters is subject to 25,000 lbs. pressure. Since the weight is usually directed diagonally downwardly, the load side of the journals will, in a relatively short time, become spalled and the bit must be replaced.

It is an object of the invention to provide a floating segment bearing made up of a multiple of segments each having much more than point or line contact, arranged about a drill bit journal for example, so that the tremendous weights to which the bits are subjected are distributed over much greater surface area.

Another object is to provide a segmented bearing of softer metal than the parts between which it functions, wherein the segments index at random with relative rotation of said parts, and whereby the segments, rather than the parts, will wear, and the wear will be uniformly distributed between the segments.

A further object is to provide a bearing construction of random indexing, nonrolling segments which can be lubricated with conventional lubricants.

Another object of the invention is to provide a floating segment bearing so constructed that the segments are capable of random indexing somewhat in the manner of ball or roller bearings, and distinguished from conventional fixed sleeve bearings so that friction is reduced to a highly practical degree and yet where spalling will not occur because of the much greater contact area between the relatively rotatable parts and the bearings.

A further object of the invention is to provide a floating segment bearing which has considerably greater surface contact with the relatively movable parts between which it is placed, as distinguished from the point or line contact of ball or roller bearings, yet wherein the segmental construction provides balanced clearance spaces incapable of achievement with sleeve bearings.

Another object of the invention is to provide a floating segment bearing which can be used between spaced concentric relatively rotatnig parts wherein the segments are so constructed that the friction between the inner and outer relatively rotatable parts is balanced to permit random indexing of the bearing segments.

A further object of the invention is to provide a floating segment bearing wherein each segment may be arcuate relative to the center of rotation but flat-sided axially of the rotation, or the segments may, as a unit, be used as a torus thrust bearing where a ball bearing assembly might be used. They may also be used for example at the end of a drill bit journal in place of the customary thrust plug.

Other objects and advantages of the invention will more fully appear from the following description in connection with the accompanying drawing:

FIG. 1 is a view of a portion of a drill bit, partially in section with embodiments of the invention incorporated therein;

FIG. 2 is a sectional view taken approximately on the line 2—2 of FIG. 1;

FIG. 3 is a perspective view of one form of bearing segment;

FIG. 4 is a sectional view taken approximately on the line 4—4 of FIG. 1;

FIG. 5 is a perspective view of one of the segments shown in FIG. 4;

FIG. 6 is a sectional view taken approximately on the line 6—6 of FIG. 1;

FIG. 7 is a perspective view of one of the bearing segments shown in FIG. 6;

FIG. 8 is a perspective view of a segmented thrust button, such as might be used in a drill bit structure;

FIG. 9 is a view partially in section of another bearing segment arrangement;

FIG. 10 is a view similar to FIG. 9, still another bearing segment arrangement;

FIG. 11 is a bottom plan view of one of the segments of FIG. 10.

In the drawing there is shown a drill bit body 12 having a journal 14 extending downwardly and outwardly therefrom. The journal has a diameter 16 between opposed faces 18 and 20, which diameter comprises a major journal bearing surface. Downwardly and outwardly from the bearing surface 16 which is flat transversely, is a transversely concave annular bearing surface 25. Customarily, the transversely flat bearing surface 16 would accommodate roller bearings and the transversely concave bearing surface 25 would accommodate ball bearings.

Located on the journal 14 for rotation thereon is a conventional drill bit cutter 23 having a bearing race 24 which is transversely flat and outwardly concentric to the journal bearing surface 16.

Located between the bearing surface 16 and the race 24 is a plurality of bearing segments 26. The segments are shown with spaces 28 therebetween. These spaces can be made considerably greater and the number of segments can be reduced if desired but it is preferred that the segments be closely spaced to provide more contact between the bearing segments and the bearing surfaces or races 16 and 24. The segments 26 have an inner arcuate surface 30 and an outwardly concentric arcuate surface 32 for contact respectively with the journal bearing surface 16 and the cutter bearing surface or race 24. The arcs of these surfaces correspond to the arcs of their respective bearing surfaces 16 and 24.

On one of the segments 26 shown in FIG. 2, are broken lines 34. They indicate the arcuate limits of the inner and outer arcuate surfaces 30 and 32. The distance between the inner ends of broken lines 34 is greater than the distance between the outer ends of said lines. In other words, the length of the arc of the inner surface 30 is slightly greater than the length of the arc of the outer surface 32. Because the radius 36 is greater than radius 38, there is in effect a greater leverage produced by radius 36; if the arcs 30 and 32 were of equal extent there would be a greater frictional drag at the outer surface 32 than at the inner surface 30. Therefore, in order to balance the frictional drag of said surfaces 30 and 32, the extent of the outer arcuate surface 32 is made sufficiently less than that of the inner arcuate surface 30 to balance the frictional drag on the two surfaces. As a result, with the metal of the journal 14 and that of the rotary cutter 23 of equal hardness or coefficients of friction there will be a random indexing or movement of the bearing segments 26 when the cutter 23 rotates on said journal 14.

The material of the bearing segments 26 has a different coefficient of friction than the material of the journal and the cutter and preferably the segments can be made of a suitable conventional bearing material having a lesser degree of hardness than that of the journal and the cutter.

Because the bearing segments 26 have a great deal more contact area with regard to the journal and cutter bearing surfaces or races 16 and 24, the bearings can be subjected to tremendous weights and such weights are nearly completely distributed around, for example, the lower half of the journal bearing surface 16 and the upper half of the cutter bearing surface 24. This distinguishes greatly from the point contact of a ball bearing and the extremely narrow line contact of a roller bearing. Because of this there is concentration of weight at highly restricted points as in the case of ball and roller bearings, and the bearing surface 16 of the journal and the bearing surface or race 24 of the cutter will remain smooth and usable for much longer periods than when roller or ball bearings are used.

It should also be noted that because the bearing is made up of segments which are fractions of the entire bearing, said segments are capable of movement, however slight, relative to each other, so that the bearing surfaces or races 16 and 24 are more truly followed, and by reason of the random indexing there is a more nearly perfect balance or filling of the clearance spaces between the bearing segments and the bearing surfaces 16 and 24. Additionally, the segments, being separate from each other provide spaces between them for the flow or movement of lubricant to more effectively distribute such lubricant around the bearing and between the bearing segments and the bearing surfaces 16 and 24. Additional lubricant space is provided by the tapers 40 at each end of the outer arc of each segment 26, which tapers are provided to reduce the length of the outer arc 32 of each segment. While, as stated in the objects, the bearing can be used with conventional lubricants known in the art, it is preferred that a leaded lubricant be employed. Finely divided metallic lead incorporated in the lubricant has provided highly successful lubrication and long bearing life.

Adjacent the bearing segments 26 and lying in a transversely concave journal bearing surface or race 25 is a bearing generally indicated at 42 made up of segments 44 which are rounded in cross section, and which as an assembly unit, provide a toric bearing form. A cross sectionally concave bit bearing section 46 is provided outwardly concentric to the surface 25 on the journal to provide the outer race for the toric segmented bearing 42. Each of the segments 44 is provided with a taper 48 at each end so that the outer peripheral arc 50 of the segment is of slightly less length than the inner peripheral arc 52. This is in accordance with the principles set forth in connection with the flat-sided segment bearing of FIG. 2. A toric type of bearing segment assembly can be used in a space more confined axially with a maximum of bearing surface and it also can be adopted to conventional constructions which frequently are provided with ball races at the point illustrated in FIGS. 1 and 4. Therefore, drastic changes in journal and cutter construction are not necessary.

In FIG. 9 there is illustrated two of the flat-sided segments 26. In the space between the segments is a thin piece of a suitable dry lubricant material 54 which may ride loosely between said segments 26. During rotation of the cutter on the journal and the above described random indexing of the segments 26, there will be a wiping of the dry lubricant material 54 on the journal and cutter bearing surfaces or races 16 and 24 respectively.

In FIG. 10 there is illustrated two flat sided bearing segments 26 which are cored radially to receive plugs of dry lubricant material 56 which also serve to assist in lubricating the bearing surfaces.

Between a flat annular face 58 on the journal and normal to the axis thereto and opposed cutter bearing surface 60, is a different form of segmented bearing made up of flat-sided segments 62 shown in FIGS. 6 and 7. These differ from the segments shown in FIG. 2 in that the flat sides 64 are the bearing surfaces rather than the inner and outer concentric arcuate edges 66 and 68 since the bearing segments 62 provide a thrust bearing assembly. Because they are thrust elements the flat opposite sides 64 of said segments are of equal area and there is no problem of difference in radii because the thrust is in an axial direction rather than in a radial direction.

In FIG. 8 there is shown a thrust button 70 which is shown in quartered segments 72, and it is the flat-sided surfaces of the thrust button which provide the bearing surfaces. The button is shown in FIG. 1 in position at the extreme end of the journal 14.

The axial thrust bearing segments 62 and 72 are of a material which has a different coefficient of friction than those of the journal and cutter bearing surfaces which they contact in the manner as the segments illustrated in FIGS. 2 and 4. They are subject to random indexing in the same manner as the previously described segments of FIGS. 2 and 4. While solid bearing thrust rings have been used where the bearing assembly of FIG. 6 is positioned, and one-piece thrust buttons have been used at the point where the segmented thrust button 70 is located, the segments disclosed have the advantage of more completely balancing the clearance spaced between the journal and cutter parts than do one-piece bearing rings or thrust buttons. As a result, wear is more evenly distributed and bearing life at those points is considerably lengthened.

In FIG. 1 there is shown a seal 74 of rubber or similar material which may be reinforced by spring elements of the Belleville type to prevent cuttings and grit from working into the bearings, and particularly to the bearing located between the journal bearing surface 16 and the cutter bearing surface 24, as well as to the bearings lying more inwardly in the cutter.

While I have illustrated and described the segmented bearing in connection with a drill bit assembly, it is of course capable of use in other types of mechanisms, particularly where the bearings are subjected to considerable radial or axial weights or stresses. The segmented bearings provide nearly as much load bearing surface as sleeve bearings for example, and while they have the advantage of independent radial or axial thrust transmitting positioning between the bearing or race surfaces, as in the case of roller or ball bearings, they overcome the above mentioned disadvantage of roller or ball bearings. This is due to the spread of the weight or thrust over a large surface area as distinguished from the line or point contact disadvantages of roller and ball bearings.

It should be understood that various changes can be made in the form, arrangement and details of the invention without departing from the spirit of the invention.

I claim:

1. A bearing assembly comprising a bearing, relatively rotatable parts having a common axis and having radial load bearing surfaces between which the bearing lies and is in frictional contact, wherein the improvement comprises: discrete multiple segments of bearing material which constitutes said bearing and comprising portions of a torus and having a different coefficient of friction than that of said parts, said segments having inner and outer arcuate bearing surfaces having constant frictional contact areas extending both axially and circumferentially and having substantially the same curvature as the respective one each of said load bearing surfaces of said parts, the radius of the outer arcuate surface being the longer and having a greater frictional leverage effect than that of the shorter radius of the inner arcuate surface, the frictional contact area of the inner arcuate surface being greater than that of the outer arcuate surface in such proportion to the differences in the lengths of said radii that the frictional drag of the two arcuate load bearing surfaces of said segments is equalized so as to provide equal wear distributing movement of said segments relative to said relatively rotatable parts.

2. A bearing assembly as in claim 1, and each of said segments being extended through approximately the same number of degrees.

3. A bearing assembly as in claim 1, and the material of said segments being less hard than that of said relatively rotatable parts.

4. A bearing assembly as in claim 1, and said segments being spaced with lubricant between them.

5. A bearing assembly as in claim 1, and at least a pair of said segments being spaced with inserts of dry film lubricant between said segments.

6. A drill bit assembly having a body, a journal extending from said body and having an annular bearing surface thereabout, a cutter having a bearing race concentric to the bearing surface of said journal, wherein the improvement comprises: a bearing of unconnected and separately movable segments of bearing material comprising portions of a torus lying about and between said journal bearing surface and said race, said segments having inner and outer arcuate bearing surfaces with constant contact areas on arcs generally corresponding both axially and circumferentially to those of said journal bearing surface and said race, the radius of the outer arcuate surface being the longer and having a greater frictional leverage effect than that of the shorter radius of the inner arcuate surface, the frictional contact area of the inner arcuate surface being greater than that of the outer arcuate surface in such proportion to the differences in the lengths of said radii that the frictional drag of the two arcuate load bearing surfaces of said segments is equalized so as to provide equal wear distributing movement of said segments relative to said relatively rotatable parts.

7. A drill bit assembly as in claim 6, and said journal bearing surface and said race being curved in cross section, and the concentric arcs of said segments having corresponding cross sectionally curved portions.

8. A bearing assembly comprising relatively rotatable parts having a common rotational axis and having radial load bearing surfaces and a bearing lying between them in frictional contact therewith, wherein the improvement comprises: segments of bearing material which constitute said bearing being disposed in a ring between said relatively rotatable parts in radial thrust transmitting relationship to the parts, said segments having radially inner and outer arcuate load bearing surfaces extending both axially and circumferentially and being of substantially the same curvature as the respective radial load bearing surfaces of said relatively rotatable parts, and said bearing surfaces having radii of different lengths from said rotational axis, the radius of the outer arcuate surface being longer and having a greater frictional leverage effect than that of the shorter radius of the inner arcuate surface, the frictional contact area of the inner arcuate surface being greater than that of the outer arcuate surface in such proportion to the differences in the lengths of said radii that the frictional drag of the two arcuate load bearing surfaces of said segments is equalized so as to provide equal wear distributing movement of said segments relative to said relatively rotatable parts.

9. A bearing assembly as in claim 8, and the outer ends of said segments being elongated circumferentially of the load bearing surfaces of said rotatable parts.

10. A bearing assembly as in claim 8, and each of said segments being extended through approximately the same number of degrees.

11. A bearing assembly as in claim 8, and the material of said segments being less hard than that of said relatively rotatable parts.

12. A bearing assembly as in claim 8, and said segments being spaced with lubricant between them.

13. A bearing assembly as in claim 8, and at least a pair of said segments being spaced with inserts of dry film lubricant between said segments.

References Cited

UNITED STATES PATENTS

| | | | |
|---|---|---|---|
| 1,760,317 | 5/1930 | Pickin | 308—219 |
| 2,526,587 | 10/1950 | Simler | 308—174 |
| 2,680,259 | 6/1954 | Milk | 308—239 |
| 2,683,637 | 7/1954 | Skillman | 308—239 |
| 3,235,316 | 2/1966 | Whanger | 308—239 |
| 3,421,799 | 1/1969 | Tallian | 308—121 |

FRED C. MATTERN, Jr., Primary Examiner

U.S. Cl. X.R.

308—73